W. H. ELLIOT.

Patched Cartridges.

No. 5,577. Reissued September 23, 1873.

Witnesses.

Harry King

H. W. Dodge

Inventor.

W. H. Elliot by Dodgerson

Attys.

UNITED STATES PATENT OFFICE.

WILLIAM H. ELLIOT, OF PLATTSBURG, ASSIGNOR TO E. REMINGTON & SONS, OF ILION, NEW YORK.

IMPROVEMENT IN PATCHED CARTRIDGES.

Specification forming part of Letters Patent No. 35,872, dated July 15, 1862; reissue No. 5,577, dated September 23, 1873; application filed July 21, 1873.

*To all whom it may concern:*

Be it known that I, WILLIAM H. ELLIOT, of Plattsburg, in the county of Clinton and State of New York, have invented certain new and useful Improvements in Cartridges; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention relates to cartridges; and it consists in the combination of a metallic shell with the powder, bullet, and a patch, all as hereinafter more fully described.

Figure 1:
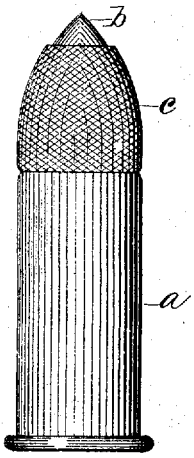
Figure 2:
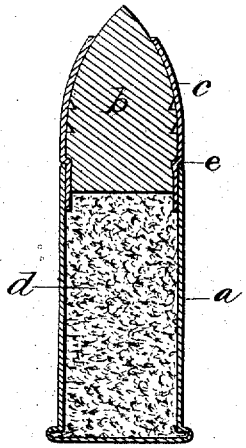
Figure 3:
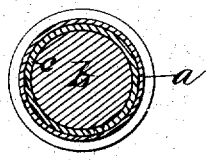

Figure 1 is a side elevation, Fig. 2 is a longitudinal section, and Fig. 3 a transverse section, of my improved cartridge.

Experience has demonstrated that greater accuracy can be obtained by using a patch on the bullet, and that its use also prevents the bore of the gun from becoming coated more or less with lead, and that it tends to wipe out and clean the bore at each discharge.

With muzzle-loading guns there is no difficulty in applying a patch, and they have long been used in that class of guns. Various plans have also been devised for applying a patch to bullets to be used in breech-loading guns, but, as a general rule, they have not been used with military arms. The introduction of metallic cartridge-shells and the elongated bullets has rendered desirable the production of a cartridge for military and sporting arms that can be made up complete as an article of manufacture or trade, and that shall have the patch so applied as to enable it to be used successfully in breech-loading guns; and to do this is the object of my present invention, and which I accomplish as follows:

I provide a metal shell, *a*, which may be made in any of the usual or desired styles, and charge it with powder, as usual, the priming or fulminate being applied in any of the known ways. I also provide a bullet, *b*, which may have a shoulder, *e*, formed thereon, as shown in Fig. 2, though this is not essential. I then provide a patch, *c*, which should be applied to the bullet, in such a manner as to envelop its body or sides, from a point in front of its largest diameter to its base, as represented in the drawings, the patch thus applied forming a tubular envelope, surrounding the bullet with uniform thickness on its sides. Having applied the patch to the bullet, as described, both are then inserted in the mouth or open end of the shell, as shown in Figs. 1 and 2, and so that the axis of the bullet shall coincide as accurately as possible with the longitudinal axis of the shell, in order that the bullet, when the cartridge is inserted in the chamber of the gun, shall be seated accurately in the bore of the arm. The object of extending the patch forward upon the conoidal portion of the bullet is to insure its front edge entering the bore, and prevent it from being stripped from the bullet as the latter is driven forward by the powder.

By these means I am enabled to produce a complete cartridge, ready for use, and in which a patch is so applied as to be successfully used in a breech-loading gun.

I am aware that a patch has been applied to a bullet intended for use in a breech-loading gun, and for which a patent was granted to L. H. Gibbs, October 28, 1858. I am also aware that a greased paper patch has been described as applied to the cylindrical portion of a bullet, for use in the Lancaster gun; and also that a circular patch of cloth has been folded over the base of the bullet and used in connection with a metallic shell; and therefore I do not claim either of these as my invention; but, Having described my invention, what I claim is—

As a new article of manufacture, a cartridge consisting of a metallic shell, with the powder, fulminate, and bullet, having a tubular patch applied thereto, substantially as described.

WM. H. ELLIOT.

Witnesses:
THOS. RICHARDSON,
J. B. PELTON.